July 20, 1943.  H. O. HILL  2,324,928
WELDED PIPE JOINT
Filed April 26, 1941
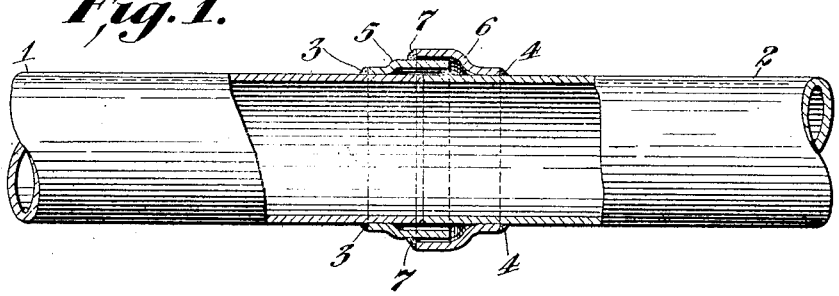
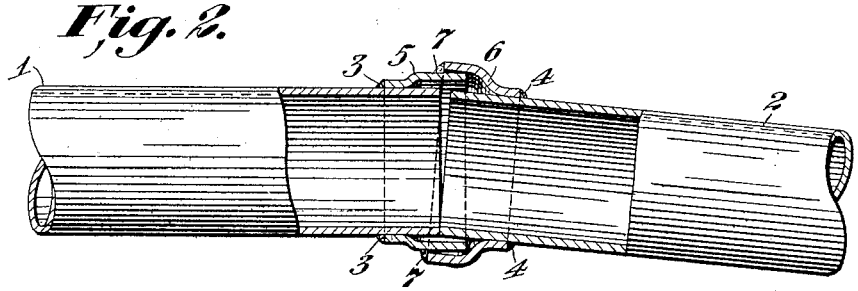
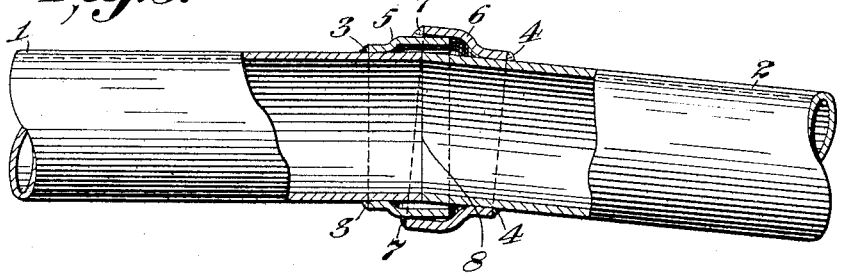
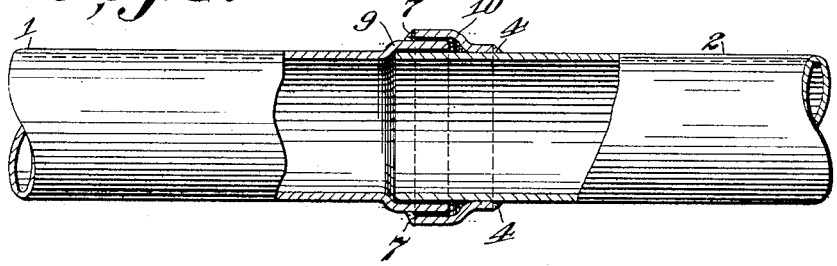
Inventor
*Harold O. Hill.*
By *R. S. A. Dougherty.*
Attorney Patented July 20, 1943

2,324,928

UNITED STATES PATENT OFFICE 2,324,928

WELDED PIPE JOINT

Harold O. Hill, Bethlehem, Pa., assignor to Bethlehem Steel Company, a corporation of Pennsylvania Application April 26, 1941, Serial No. 390,500

4 Claims. (Cl. 285—115)

This invention relates to a welded pipe joint for assembling pipe lines carrying fluids, and particularly to a welded coupling of the bell or expanded end or sleeve type which is adapted for field welding of coated or lined pipes without damage to the lining.

For field joints in water supply lines and the like, it has been customary to use mechanical couplings such as the Dresser joint on pipes coated or lined with spun asphalt or coal tar, cement, lacquer, paint, plastic or the like. Such mechanical couplings are quite expensive and contribute materially to the total cost of a water line; the joints require very accurate forming of pipe ends so that the couplings will fit over same and so that the gaskets may be drawn up tightly; and the field erection of mechanical couplings involves considerable expense for fitting and tightening of bolts.

Welding, either by the electric arc or the oxyacetylene process, has the advantage of being relatively quick and inexpensive, but the intense heat developed is apt to damage or destroy the lining of the pipe and leave the pipe exposed to interior corrosion at every welded joint.

Particularly is this true of the smaller pipe sizes. Pipe twenty-four inches or larger in diameter can be butt-welded from the outside and if necessary a finish welding bead can be applied on the inside. Such pipe can also be entered for re-coating purposes, and the portion of pipe adjacent to the seam can thus be cleaned and re-coated. Conversely, pipe under twenty-four inches in diameter can not well be worked upon from the inside. It therefore is quite necessary to provide for welding the joint without entering the pipe subsequently for re-coating in the case of smaller pipe, while for larger pipe it is still a highly convenient and time-saving consideration.

One object of my invention is to provide a pipe joint which will absorb a moderate amount of angular misalignment and accommodate expansion and contraction due to temperature changes.

Another object of my invention is to provide a welded joint which will not impair the resistance to corrosion of coated pipe.

Another object is to provide a welded pipe joint particularly adapted to coated pipes and the like which are too small for convenient re-touching interiorly after welding.

Another object is to provide a pipe joint having an insulating air space to protect the interior surface of coated pipe when welded.

Another object is to provide a cheap and efficient field joint for coated pipe.

Still another object is to provide a welded pipe joint characterized by ease of assembly and flexibility of alignment.

Further objects, purposes and advantages of my invention will be set forth in the following specification and claims.

With this general description of the advantages of my invention, I shall now in order to make the same more clear, refer to the annexed sheet of drawings forming a part of this specification and in which like characters of reference indicate like parts.

Figure 1 is a vertical longitudinal section of a form of my pipe joint in which expanded sleeves are welded to both pipes;

Fig. 2 is a vertical longitudinal section of the same type of joint as in Fig. 1, showing how it may be adapted to take small angles without change;

Fig. 3 is a vertical longitudinal section of the same type of joint as in Figs. 1 and 2, but showing the beveled pipe end required for larger angles or tighter joints than in Fig. 2; and Fig. 4 is a vertical longitudinal section of a modification of my improved joint wherein one of the ends to be joined is belled and a single sleeve is used on the adjoining or spigot end.

In the form of my invention shown in Figures 1 to 3, inclusive, pipe sections 1 and 2 have welded thereto, circumferentially about each pipe at points 3 and 4 near their ends, enlarged bell-shaped ring sleeves 5 and 6, respectively. As a matter of convenience said sleeves will usually be attached to the pipes at the factory, thus saving time and effort in the field, and such factory welding may be done before the interior coating of spun tar or the like is applied, or the interior of pipes already coated may be re-touched after said welding.

The joint itself is made up in the field. The sleeves are prepared for welding by thoroughly cleaning and removing any trace of coating or dirt that might affect the quality of the weld, after which the end of pipe 1 having smaller ring sleeve 5 is inserted within larger ring sleeve 6, held in as nearly correct alignment as possible, and quickly tack-welded at 7, after which the welding is completed.

No inside re-coating is necessary, although the outside of the sleeves at the weld may be re-coated after welding, if desired, and no chill ring is needed.

This arrangement may also be used without substantial change to give an angle joint of the order of 5° or less, as shown in Figure 2; but where the enclosed angle is much larger than 5°, or a tight inside joint is desired, it is preferable that the end of one or both pipes be beveled, as shown at 8 in Figure 3.

An alternative type of welded joint is that shown in Figure 4, wherein the male or inserted pipe end is expanded or belled as at 9, and a single larger sleeve 10 welded as above forms the female coupling portion.

Although I have shown and described this invention in considerable detail, I do not wish to be limited strictly to the exact and specific details shown and described, but may use such substitutions, modifications or equivalents thereof as are embraced within the scope of the invention or as are pointed out in the claims, and at one or both ends of each pipe as required.

Having thus described my invention, what I claim as new and useful and desire to secure by Letters Patent is:

1. A joint for connecting metallic pipe having a heat-destructible inner coating, comprising a plurality of coated pipe sections with their ends in abutting relation, bell-shaped sleeves of different sizes secured near the abutting ends of each section and projecting forwardly beyond said ends, the smaller sleeve being inserted within the larger sleeve normally in spaced relation therewith, and a welded connection between the outer end of the larger sleeve and the outer side of the smaller sleeve so arranged and adapted as to provide a heat-insulating air space beneath said welded connection preventing impairment of the heat-destructible inner coating by the heat of welding.

2. A joint for connecting metallic pipe having a heat-destructible inner coating, comprising a pair of coated pipe sections, a bell portion integrally formed near an end of one pipe section with its inner base abutting an end of the second pipe section, a larger bell-shaped sleeve secured near said end of the second pipe section adapted to overlap in loose, spaced relation the bell portion, and a welded connection between the outer end of the sleeve and the outer side of the bell sufficiently removed outwardly from the heat-destructible inner coating to prevent damage by the welding heat.

3. A pipe joint is claimed in claim 1 having an end of one of the pipe sections beveled to form an angular joint.

4. A pipe joint as claimed in claim 1 having the adjacent ends of both pipe sections beveled to form an angular joint.

HAROLD O. HILL.